United States Patent [19]
Yoo

[11] Patent Number: 5,495,360
[45] Date of Patent: Feb. 27, 1996

[54] 1.5 μM WAVELENGTH ASYMMETRIC FABRY-PEROT MODULATOR WITH NEGATIVE CHIRP

[75] Inventor: Sung-Joo Yoo, Long Branch, N.J.

[73] Assignee: Bell Communications Research Inc., Morristown, N.J.

[21] Appl. No.: 349,098

[22] Filed: Dec. 2, 1994

[51] Int. Cl.$^6$ ............................................. G02F 1/03
[52] U.S. Cl. ................... 359/248; 359/248; 359/260; 372/45
[58] Field of Search ................... 359/260, 248; 372/45

[56] References Cited

U.S. PATENT DOCUMENTS

| | | | |
|---|---|---|---|
| 4,811,352 | 3/1989 | Suzuki et al. | 372/45 |
| 5,315,430 | 5/1994 | Brennan et al. | 359/248 |
| 5,345,328 | 9/1994 | Frite et al. | 359/248 |

OTHER PUBLICATIONS

A. H. Gnauck, et al, "Dispersion Penalty Reduction Using an Optical Modulator with Adjustable Chirp," *IEEE Photonics Technology Letters*, vol. 3, No. 10, Oct. 1991, pp. 916–918.

F. Devaux et al., "20 Gbit/s Operation of a High–Efficiency In GaAsP/InGaAsP MQ Electroabsorption Modulator with 1.2–V Drive Voltage", *IEEE Photonics Technology Letters*, vol. 5, No. 11, Nov. 1993, pp. 1288–1290.

L. Buydens et al., "High–Contrast/Low–Voltage Normally on InGa As/AlGaAs Asymmetric Fabry–Perot Modulator", *IEEE Transactions Photonics Technology Letters*, vol. 3, No. 12, Dec. 1991, pp. 1104–1106.

S. J. B. Yoo et al., "Quasi–CW Room–Temperature Operation of 1.55 μm Vertical Cavity Surface Emitting Lasers Grown by OMCVD", *IEEE Lasers & Electro–Optics Society 1992 Annual Meeting*, Post Deadline Paper PD6, Nov. 1992.

*Primary Examiner*—Georgia Y. Epps
*Assistant Examiner*—Dawn-Mane Bey
*Attorney, Agent, or Firm*—Leonard Charles Suchyta; James W. Falk

[57] ABSTRACT

An asymmetric Fabry-Perot modulator (AFPM) is disclosed having an operating wavelength in the 1.5 μm region used for long-haul optical transmission. The AFPM includes electro-absorption material consisting of an $Al_xIn_yGa_{1-x-y}As$ multiple quantum well structure. An amplitude modulated optical signal is produced by modulating the bias voltage across the electro-absorption material between zero bias and the matching voltage that gives zero reflectivity from the cavity formed by the electro-absorption material and top and bottom reflectors. An amplitude modulated optical signal having a negative chirp parameter is produced by coating the top of the modulator with a high-reflectivity coating to reduce the voltage required to achieve the matching condition and then modulating the electro-absorption material between the matching voltage and a higher voltage.

14 Claims, 3 Drawing Sheets

1.5 μM WAVELENGTH ASYMMETRIC FABRY-PEROT MODULATOR WITH NEGATIVE CHIRP

BACKGROUND OF THE INVENTION

This invention relates to the modulation of laser light amplitude for transmitting digital signals over optical fiber transmission systems.

By modulating the amplitude of light inputed into an optical fiber in accordance with the "1"s and "0"s in a digital signal, the digital signal can be transmitted and then recovered at the far end of the fiber by a photodetector which recognizes the changing amplitude of light and converts these changes into an electrical signal for further processing. Generally, a laser diode serves as the transmitting light source, which output is to the transmitting fiber. One way that the light to be transmitted can be converted to a pulsed digital light signal is by directly modulating the electrical current through the laser diode in accordance with the digital signal to be transmitted. Modulating the current through the laser diode modulates the gain of the laser, which translates into a desired pulsed amplitude optical output. Alternatively, a laser diode biased with a fixed current produces a constant amplitude light output, which then can be modulated by an external optical modulator to produce the desired pulsed digital optical signal for transmission.

In the first method, modulation of the current through a laser diode introduces a large phase change to the modulated optical signal to be transmitted. The chirp parameter of the modulated signal, which is defined as the ratio of phase change rate to amplitude change rate, is thus relatively high. The transmission characteristics of an optical fiber normally cause pulse signals to spread or sanear as they are transmitted, which dispersion effect is particularly noticeable when transmitting very high-speed signals over long-haul transmission facilities. This dispersion can make accurate detection at the receiving end difficult. A signal with a high positive chirp parameter will be even further degraded when transmitted and thus be even more difficult to detect accurately at the receiver.

The second method, which does not require modulation of the electrical current through the laser diode, inherently has a low chirp parameter and is thus advantageous for high-speed long-haul transmission. Various prior art approaches can be used to externally modulate the constant light output of a laser diode. In a first approach, a $LiNbO_3$ Mach-Zehnder modulator (see, e.g., A. H. Gnauck et al, "Dispersion Penalty Reduction Using an Optical Modulator with Adjustable Chirp," IEEE *Photonics Technology Letters*, Vol. 3, No. 10, October 1991, pp. 916–918) is used to modulate the light by an interferomic sum of two optical waves originating from the laser diode, wherein each wave is phase modulated by a different amount. In order to function properly, the phase velocity of the electrical signal wave must match the the optical signal phase velocity. Since, however, the electrical signal wave contains spectrum at both high and low frequencies, it is extremely difficult to achieve this goal over a wide frequency range.

A second approach for modulating the light output of a laser diode uses a semiconductor electro-absorption waveguide (see, e.g., F. Devaux et al., "20 Gbit/s Operation of a High-Efficiency InGaAsP/InGaAsP MQW Electroabsorption Modulator With 1.2-V Drive Voltage, IEEE *Photonics Technology Letters*, Vol. 5, No. 11, November 1993, pp. 1288–1290). This modulator functions by shifting the bandgap of the semiconductor material by an applied electrical field, which is modulated by the digital signal to be transmitted. Disadvantageously, however, modulation with only a positive chirp parameter is possible which, as aforenoted, means that transmission over an optical fiber can only exacerbate the dispersion problem. Furthermore, in some instances this approach is polarization sensitive.

Using an asymmetric Fabry-Perot modulator (AFPM) is a third approach for modulating the light output of a laser diode (see, e.g., L. Buydens et al, "High-Contrast/Low-Voltage Normally On InGaAs/AlGaAs Asymmetric Fabry-Perot Modulator" IEEE *Transactions Photonics Technology Letters*, Vol. 3, No. 12, December, 1991). The AFPM modulates a constant amplitude light input by modulating the electro-absorption of a semiconductor material within an optical cavity defined by top and bottom reflectors. By modulating the electrical field across the electro-absorption material consisting of a multiple quantum well semiconductor structure disposed between the top and bottom reflectors, the optical absorption of the semiconductor material varies and by that, so does the total reflectivity of the cavity. Specifically, unmodulated constant amplitude light that is incident upon the top reflector is reflected in part and transmitted in the other part through the electro-absorption material. The transmitted through part is reflected by the bottom reflector, transmitted again through the electro-absorption material, and recombined with the original part of the incident light reflected by the top reflector. When the absorption in the electro-absorption material is low, the reflection of the incident light is dominated by the bottom reflectance and the total reflection is high. When the electro-absorption within the material is increased by increasing the applied field, the total reflectivity starts to decrease. When the absorption in each direction in the cavity, A (v), equals $\frac{1}{2}(R_b-R_t)$, where $R_b$ is the reflectivity of the bottom reflector and $R_t$ is the reflectivity of the top reflector, a cavity matching condition is achieved and the total reflectivity, $R_{total}$, equals zero.

Varying the electro-absorption between low (essentially zero) reflectivity at the matching condition voltage and high reflectivity at low or zero voltage across the cavity therefore causes the magnitude of the reflected signal to be modulated in accordance with the modulating electrical field. When the parameters of the cavity, which include the top and bottom reflectivities and the absorption within the electro-absorption material, are chosen properly, the ratio between the amplitude of a "1" and a "0" pulse, defined as the extinction or contrast ratio, is sufficiently large enough to ensure detection at the receiving end. Advantageously, AFPMs can achieve polarization insensitivity and can operate at high-speeds ranging from DC to 40 GHz. Furthermore, their modulated output signal has only a small positive chirp. Disadvantageously, however, the properties of the material composition of the electro-absorption material in prior art AFPMs have been such that they could only operate in wavelength regions between 0.8 and 1.0 μm. Long-haul transmission, however, requires transmission in the lower-loss wavelength region of 1.5 μm. An external modulator that operates at wavelengths in the desirable 1.5 μm region is thus required.

An object of my the asymmetric Fabry-Perot modulator of present invention is to modulate a constant current light input having a wavelength in the region of 1.5 μm at which long-haul optical transmission can take place.

An additional object of the present invention is to produce a modulated light output that has a negative chirp parameter in order to pre-compensate for the accumulation of the positive dispersion effect that normally occurs when the modulated signal is transmitted over optical media.

SUMMARY OF THE INVENTION

The asymmetric Fabry-Perot modulator of the present invention comprises two reflectors and a cavity formed by two spacers and electro-absorption material. In accordance with the invention, it has been found that electro-absorption material consisting of an $Al_xIn_yGa_{1-x-y}As$ multiple quantum well structure enables the modulator to operate in the desired wavelength region of 1.5 μm. The total absorption in the electro-absorption material, which is proportional to the number of periods of the multiple quantum well structure, must be large enough to allow a cavity matching condition. This cavity matching condition has been defined hereinabove as being $A(v)=½(R_b-R_t)$, where A (v) is the one-way electro-absorption at the operating wavelength and applied voltage. Each period of the multiple quantum well structure consists of $Al_xIn_yGa_{1-x-y}As$ barriers of thickness $L_b$ of value larger than 30 Å and of Al content x>0.12, and $Al_xIn_yGa_{1-x-y}As$ wells of thickness $L_w$ of value between 20 Å and 500 Å and Al content x<0.10. Indium content y is maintained at 0.53±0.15 to maintain a reasonable lattice matching to an InP substrate.

In a further refinement of the modulator of the present invention, a modulated optical output signal having a negative chirp parameter is produced by operating the modulator in a region in which the amplitude change rate is opposite in sign to the phase change rate. This is achieved by using a top reflector with high reflectivity so that the matching condition is reached at a lower bias voltage across the electro-absorption material. The electro-absorption material is then varied between the voltage at which the matching condition is reached and a higher bias voltage. At the matching condition voltage the total reflectivity (and thus amplitude) versus applied voltage characteristic function changes direction and increases with increasing magnitude voltage, while the phase versus voltage characteristic function monotonically decreases with increasing voltage magnitude. Modulating the electro-absorption material between the matching condition voltage and a higher voltage thus produces an amplitude modulated optical signal with the desired negative chirp parameter.

DETAILED DESCRIPTION

It has been found that an asymmetric Fabry-Perot modulator can operate in the 1.5 μm wavelength region by an appropriate choice of the multiple quantum well material that constitutes the electro-absorption region of the modulator.

Figure 1:
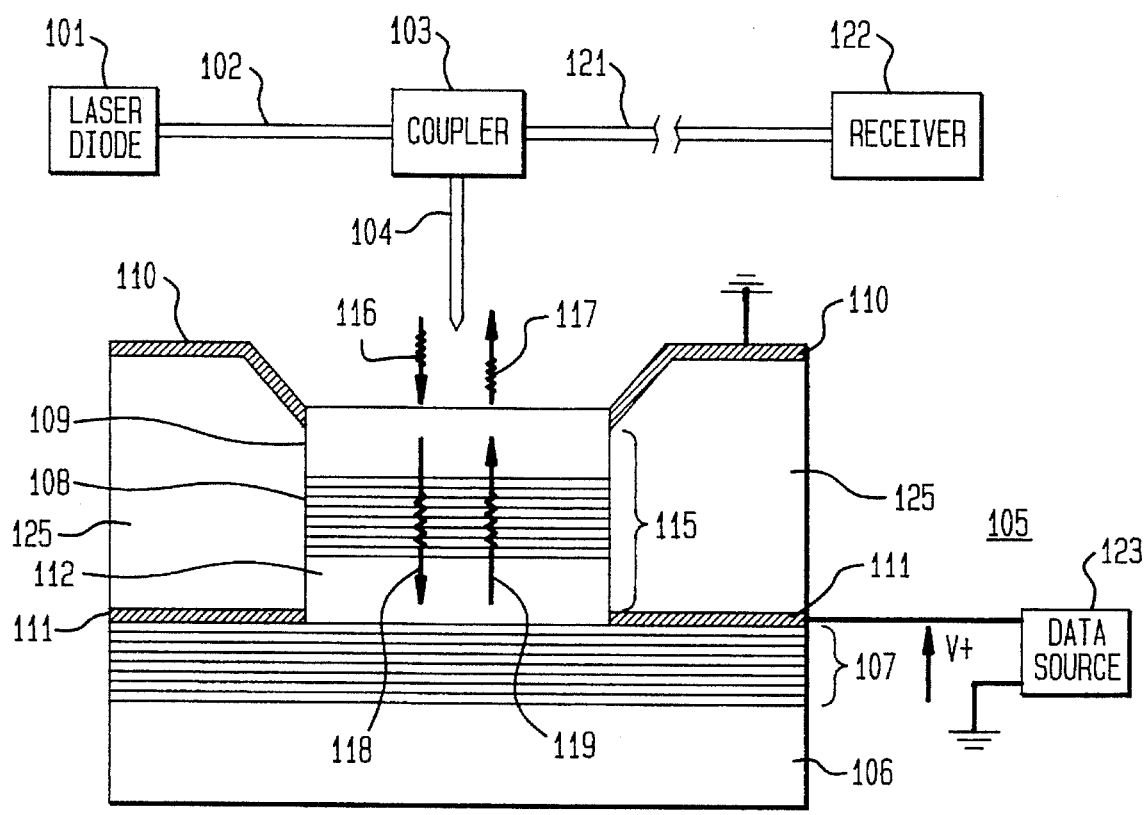
FIG. 1 shows a cross-sectional view of the asymmetric Fabry-Perot modulator of the present invention as used in the transmitter of an optical communications network.

With reference to FIG. 1, laser diode 101 produces a constant amplitude continuous optical signal which is outputted onto fiber 102. A coupler 103 couples that unmodulated signal onto fiber 104, the optical output of which is incident upon the AFPM 105 of the present invention, which is illustrated in cross-section.

The AFPM vertical cavity wafer structure 105 is grown on a semi-conductor substrate 106, such as InP, by means of an organo-metallic chemical vapor deposition (OMCVD) process. It includes a bottom planar mirror 107, such as a multi-period distributed Bragg reflector (DBR), (see, e.g., S. J. B. Yoo et al, "Quasi-CW Room-Temperature Operation of 1.55 μm Vertical Cavity Surface Emitting Lasers Grown by OMCVD, IEEE *Lasers & Electro-Optics Society* 1992 *Annual Meeting*, Post Deadline Paper PD6, November, 1992), and electro-absorption material 115, which includes an n-type spacer 112 of, for example, InP, a multi-period quantum well structure 108, and a p-type spacer 109 of, for example, InP. Metallic contacts 110 and 111 are disposed between the top and bottom surfaces of electro-absorption material 115, respectively, as shown. Electrical insulator 125 separates contacts 110 and 111.

The lightwave 116 incident upon the air/InP interface of the p-type spacer 109 at the top-most surface of the electro-absorption material 115 is reflected in part (lightwave 117) and transmitted through material 115 in its other part (lightwave 118), depending upon the top reflectance, $R_t$. The transmitted through part 118, which is absorbed in part by the electro-absorption material 115, is reflected in part by mirror 107 (lightwave 119), depending upon the reflectance, $R_b$, of mirror 107. The total light, $R_{total}$, reflected by AFPM 105 is the interferomic sum of lightwave 117 and the light that is reflected back and forth within the cavity and passed through the top surface of the material 115. $R_{total}$ can be shown to be a function of $R_t$, $R_b$, and the electro-absorption of the electro-absorption material 115.

By grounding contact 110 and imposing a positive voltage v on contact 111, the absorption of light through material 115 increases, thereby decreasing $R_{total}$. Therefore, $R_{total}$ can be modulated by modulating the voltage v on contact 111 in accordance with the binary "1"s and "0"s in the digital signal to be transmitted from data source 123. This amplitude modulated reflected signal is directed back through fiber 104 and through coupler 103 for transmission over long-haul optical facilities 121 to a receiver 122.

In order to ensure the most accurate detection at the receiving end, the ratio at the transmitting end between the optical amplitude for a binary "1" and the optical amplitude for a binary "0", known as the extinction or contrast ratio, must be as large as possible. The absorption of light, A, in each direction through electro-absorption material 115 is a function of the voltage v. It can be shown that when A (v) equals $½(R_b-R_t)$, known as the cavity matching condition, then $R_{total}$ is zero, thereby minimizing the amplitude of the reflected light. Thus, modulating the voltage v between zero volts, where absorption is minimum and reflection is maximum, and the positive voltage, $V_{match}$, at which the matching condition occurs and reflection is minimum, yields a maximum extinction ratio.

In order to function as an AFPM, the electro-absorption material must have sufficient absorption at the desired wavelength of operation to allow a cavity matching condition. Typically, multiple quantum wells (MQWs) of InGaAsP, or similar, material have been used in prior art AFPMs. When such material composition was attempted for operation in an AFPM in the desirable 1.5 μm wavelength range, however, sufficient electro-absorption could not be achieved. Specifically, when multiple periods of InGaAsP MQWs were grown, the inter-fixing effect in this material in the desired wavelength region diminished the electro-absorption effect of the material to a point that precluded their use.

What I have discovered is that electro-absorption material consisting of an $Al_xIn_yGa_{1-x-y}As$ MQW structure yields the necessary electro-absorption at the desired operating wavelength in the 1.5 μm wavelength region. Specifically, the number of periods of quantum well material must be large enough to achieve the cavity matching condition, described above as a function of the reflectances $R_t$ and $R_b$. Each period of the multiple quantum well structure consists of $Al_xIn_yGa_{1-x-y}As$ barriers of thickness $L_b$ of value large than 30 Å and of Al content x>0.12, and $Al \times In_yGa_{1-x-y}As$ wells of thickness $L_w$ of value between 20 Å and 500 Å and Al content x<0.10. Indium content y is maintained at 0.53±0.14 to maintain a reasonable lattice matching to the InP substrate.

Figure 2:
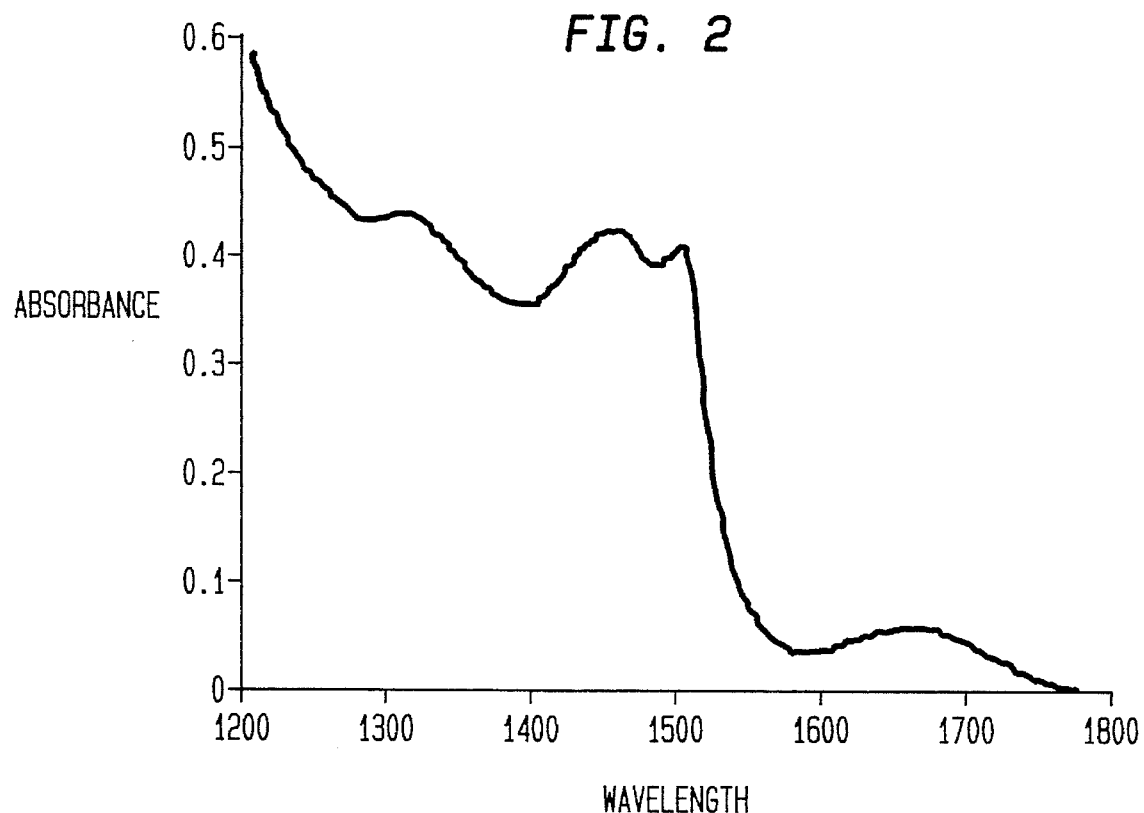
FIG. 2 shows the absorption spectra of the electro-absorption material used in an embodiment of the present invention.
Figure 3:
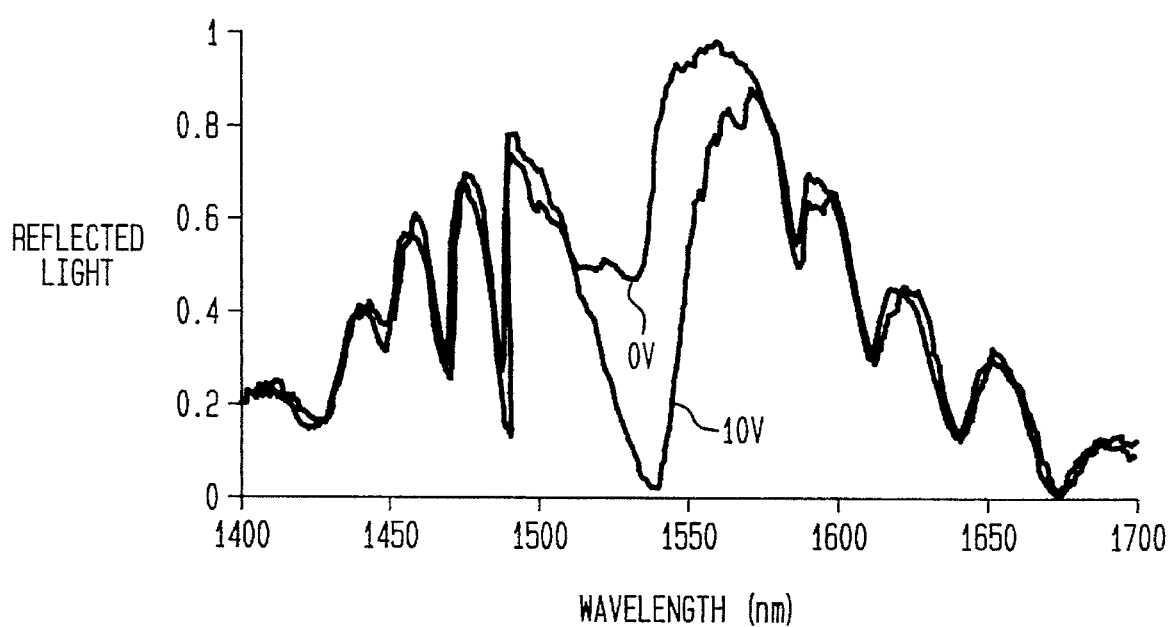
FIG. 3 shows the reflectivity spectra an embodiment of the AFPM of the present invention.

Experimentally, an AFPM wafer was OMCVD grown on a semi-insulating InP substrate consisting of a 42.5 pair InP/nGaAsP distributed Bragg reflector of the type aforenoted. A 3000 Å n-type InP spacer, 80 periods of the AlInGaAs/AlInGaAs quantum well structure, and a 3700 Å p-type InP spacer were grown on top of the reflector. The reflectance spectrum of the DBR showed a high reflectivity band (>99%) centered at 1535 nm, with a bandwidth of approximately 100 nm. FIG. 2 shows the absorption spectrum at zero bias of the 80 quantum wells grown on the InP substrate. The absorption spectrum shows a distinct excitonic feature centered at 1510 nm with a full-width at half-maximum of 18 nm. FIG. 3 shows the spectra of the light reflected from the modulator with DC bias voltages of 0 V and 10 V. The measured insertion loss and extinction ratio at 1535 nm were 2.2 dB and 15 dB, respectively. The reflectivity, $R_t$, of the InP/air interface was 27%. Theoretical calculations based on transfer matrix method using the measured parameters predict that the above-described modulator can achieve a greater than 25 dB contrast ratio with a 4 V bias voltage with a 50% top reflector.

The embodiment of the present invention described hereinabove has a high contrast ratio at the desired operation in the 1.5 μm wavelength region. It, however, has a small but positive chirp parameter. In order to compensate for the positive dispersion caused by transmission of the optical pulses over an optical facility, a pre-compensated optical signal having a negative chirp parameter can be transmitted. Thus, rather than transmitting a signal with positive chirp, which only exacerbates the effect of the positive dispersion imposed by the transmission medium, transmitting a signal having negative chirp reduces the overall dispersion seen by the receiving terminal. High-speed accurate detection is thereby facilitated.

Figure 4:
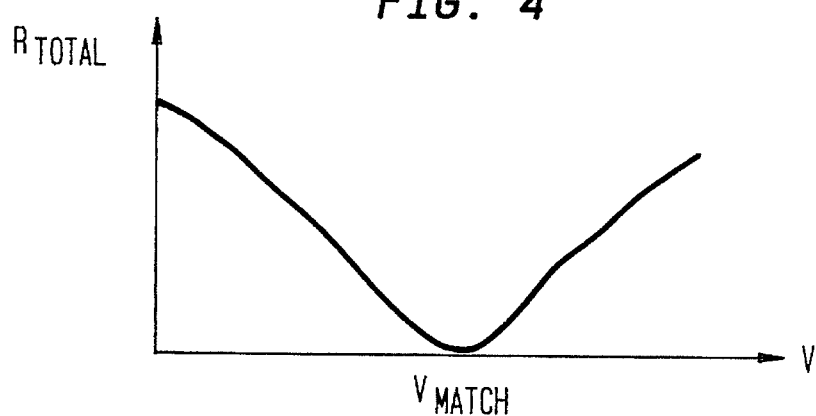
FIG. 4 shows the relationship between the total reflected light from the AFPM in FIG. 1 and the bias voltage across the electro-absorption material.
Figure 5:
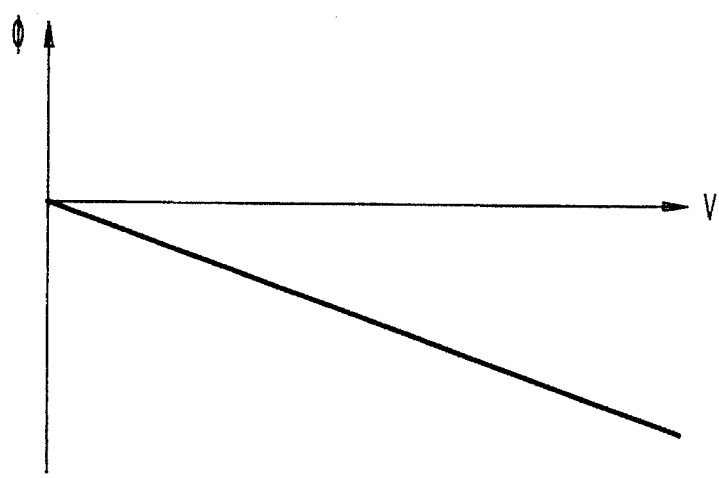
FIG. 5 shows the relationship between phase and the bias voltage across the electro-absorption material.

As previously noted, the chirp parameter is defined as the ratio of phase change rate to amplitude change rate. FIG. 4 shows the relationship between $R_{total}$, or amplitude intensity, and bias voltage, v. As can be noted, $R_{total}$ decreases from its maximum at zero bias to a minimum at the matching voltage, $V_{match}$, at which the matching condition takes place. By further increasing the bias voltage, reflectivity again increases. Phase, on the other hand, is directly proportional to the negative of refractive index, which monotonically increases with an increasing applied field. Thus, as shown in FIG. 5, phase, φ, monotonically decreases with increasing v. Thus, operating the AFPM in a region in which the amplitude is increasing and the phase is decreasing, produces a signal which has a negative rather than positive chirp parameter. To achieve a maximum extinction ratio and negative chirp, therefore, the AFPM is operated in a region between $V_{match}$ and a higher bias voltage, rather than between 0 volts and $V_{match}$.

Figure 6:
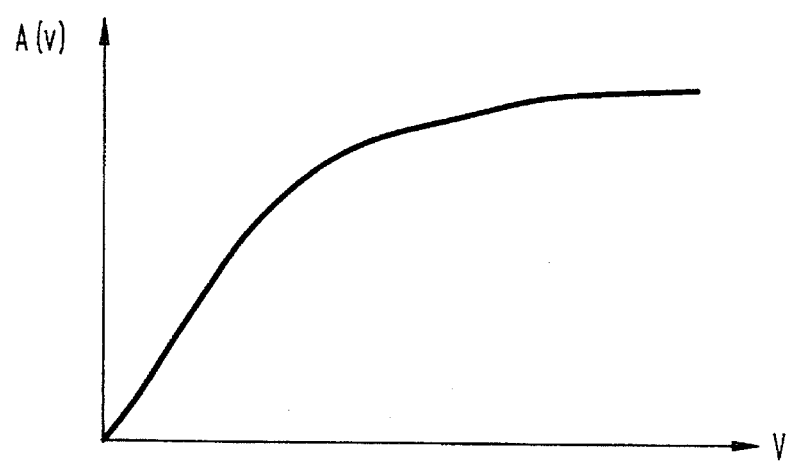
FIG. 6 shows the relationship between the electro-absorption in the electro-absorption material and the bias voltage.

FIG. 6 shows the relationship between A(v), the electro-absorption in the MQW material, and the applied voltage, v. As can be noted, A (v), saturates above some absolute threshold voltage. For the AFPM in FIG. 1, with the parameters noted hereinabove of $R_t$=27%, $R_b$=99%, and $V_{match}$= 10 volts, A(v) is close to saturation with a 10 volt bias. Operating the AFPM between this $V_{match}$ and a higher voltage v, will not produce a pulsed output signal with a sufficiently large extinction ratio. Accordingly, in order to enable the AFPM to operate in the unsaturated region of the v versus A(v) characteristic, $V_{match}$ is reduced by increasing the reflectivity of the top surface of the AFPM.

Figure 7:
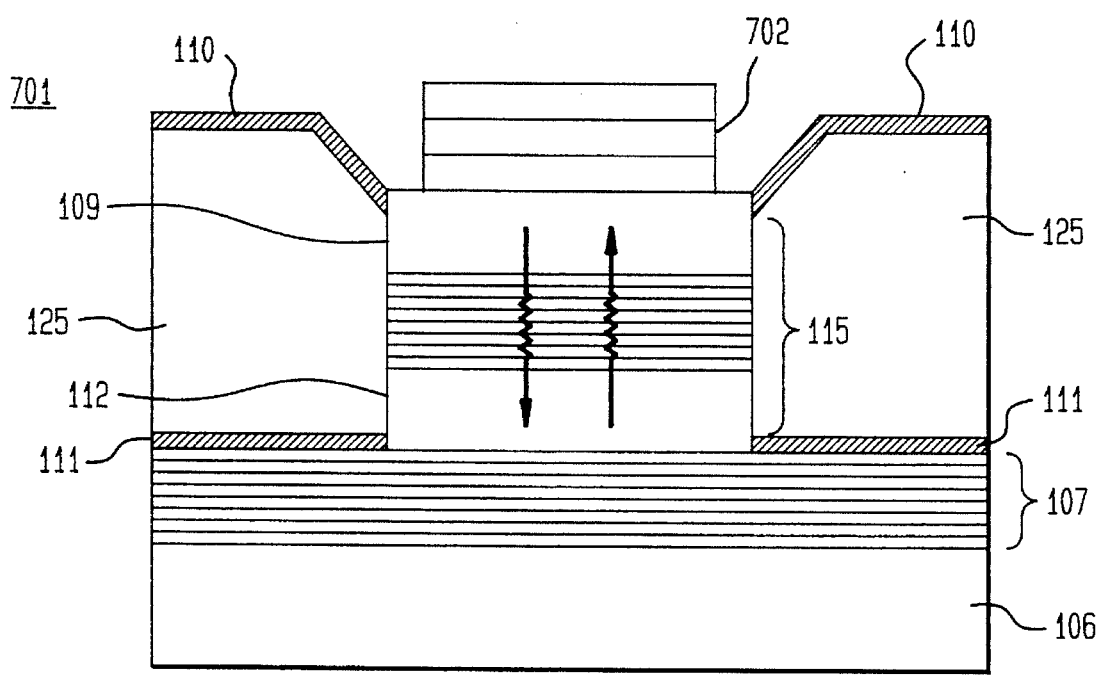
FIG. 7 shows an embodiment of an AFPM in accordance with the present invention that produces an output signal having a negative chirp parameter.

FIG. 7 shows an AFPM 701 which produces an optical output signal with a negative chirp parameter. The same numerical designations are given to those common elements in FIGS. 1 and 7. In this embodiment AFPM 701, similar in other ways to AFPM 105 in FIG. 1, includes a top reflector 702, deposited on the top surface of p-type InP spacer 109 of the electro-absorption material 115. Thus, rather than just using the relatively low reflectivity of the air/InP interface as the top reflector, reflector 702 provides a high reflectivity, $R_t$, that decreases the matching voltage, $V_{match}$, at which the matching condition occurs.

In an experimental embodiment of the present invention, a $Si/SiO_2/Si$ dielectric coating of thickness 552 Å, 2685 Å, and 1114 Å each is deposited on top of the modulator as the top reflector. This coating has a reflectivity of 81%. With this reflectivity, the matching condition is achieved by an applied field of 4.3 V, rather than the 10 V required in the embodiment of FIG. 1. From this lower voltage, therefore, the modulator can be operated in the unsaturated region of the v versus A (v) characteristic in FIG. 6. In this configuration, the modulator achieved a 21 dB contrast ratio with a 5.9 dB insertion loss. As the applied bias voltage increases from 0 V to 4.3 V, reflectivity $R_{total}$ decreases from −5.9 dB to −21 dB. As the bias voltage further increases from 4.3 V to 10 V, $R_{total}$ increases from −21 dB to −6 dB. Advantageously, the resultant pulsed optical output signal has a negative chirp parameter that compensates for the positive dispersion in the optical fiber over which the signal is transmitted. A lower reflectivity coating will also enable the AFPM 701 to produce a negative chirp output. For the 80 period MQW structure used in the embodiments described hereinabove a reflectivity of greater than 50% will sufficiently reduce the matching voltage to a point that allows the modulating in the unsaturated region of the v versus A(v) characteristic. Although shown with a coating, high reflectivity of the top surface can be achieved by other means.

Although described hereinabove to modulate binary digital signals, the modulator of the present invention could also be used in a similar manner to modulate light amplitude in response to an analog or multi-level digital signal.

The above-described embodiments are illustrative of the principles of the present invention. Other embodiments could be devised by those skilled in the art without departing from the spirit and scope of the present invention.

What is claimed is:

1. An asymmetric Fabry-Perot modulator (AFPM) for amplitude modulating an incident optical input signal having an operating wavelength in the region of 1.5 μm in response to an external modulating signal, said modulator comprising:

a top reflector surface upon which said input signal is incident;

a bottom reflector having high reflectivity; and electro-absorption material disposed between said top reflector surface and said bottom reflector, the absorption of said electro-absorption material being varied in response to said external modulating signal, the magnitude of the total optical output signal from said top reflector surface being determined by the reflectivity of the top reflector surface, the reflectivity of the bottom reflector and the absorption in said electro-absorption material;

characterized in that said electro-absorption material comprises an $Al_xIn_yGa_{1-x-y}As$ multiple quantum well structure having a sufficient number of periods to achieve a matching condition output in which an approximately zero magnitude output signal is produced when the magnitude of said modulating signal is at an associated matching condition voltage, said multiple quantum well structure comprising $Al_xIn_yGa_{1-x-y}As$ barriers of thickness larger than 30 Å and Al content $x \geq 0.12$, and $Al_xIn_yGa_{1-x-y}As$ wells of thickness between 20 Å and 500 Å and Al content $x \leq 0.10$.

2. The AFPM in accordance with claim 1 wherein the In content y equals 0.53±0.15.

3. The AFPM in accordance with claim 1 wherein said modulating signal is a digital signal and a bias voltage across said electro-absorption material is varied in response to said digital signal.

4. The AFPM in accordance with claim 3 wherein the bias voltage is varied between zero bias volts and said matching condition voltage.

5. The AFPM in accordance with claim 3 wherein a high reflectivity coating is disposed on top of said top reflector surface, and said bias voltage is varied between said matching condition voltage and a higher magnitude voltage to produce a modulated optical output signal having a negative chirp parameter.

6. The AFPM in accordance with claim 3 wherein said top reflector surface has a reflectivity greater than 50%, and said bias voltage is varied between said matching condition voltage and a higher magnitude voltage to produce a modulated optical output signal having a negative chirp parameter.

7. The AFPM in accordance with claim 5 wherein said coating is a $Si/SiO_2/Si$ dielectric coating.

8. An optical transmitter for transmitting a digital signal over an optical fiber transmission facility comprising:

a laser diode for producing an essentially constant amplitude optical signal in the 1.5 μm wavelength region;

an asymmetric Fabry-Perot modulator (AFPM) for amplitude modulating said constant amplitude optical signal in accordance with said digital signal; and means for coupling said amplitude modulated optical signal to said optical fiber transmission facility;

said AFPM comprising:

a top reflector surface upon which said constant amplitude optical signal is incident;

a bottom reflector having high reflectivity; and electro-absorption material disposed between said top reflector surface and said bottom reflector, the absorption of said electro-absorption material being varied in response to said digital signal, said electro-absorption material comprising an $Al_xIn_yGa_{1-x-y}As$ multiple quantum well structure having a sufficient number of periods to achieve a matching condition in which an approximately zero magnitude signal is produced by said AFPM when the magnitude of said modulating signal is at an associated matching condition voltage, said multiple quantum well structure comprising $Al_xIn_yGa_{1-x-y}As$ barriers of thickness larger than 30 Å and Al content $x \geq 0.12$, and $Al_xIn_yGa_{1-x-y}As$ wells of thickness between 20 Å and 500 Å and Al content $x \leq 0.10$.

9. The optical transmitter in accordance with claim 8 wherein the In content y equals 0.53±0.15.

10. The optical transmitter in accordance with claim 8 wherein a bias voltage across said electro-absorption material is varied in response to said digital signal.

11. The optical transmitter in accordance with claim 10 wherein the bias voltage is varied between zero bias volts and said matching condition voltage.

12. The optical transmitter in accordance with claim 10 wherein a high reflectivity coating is disposed on said top reflector surface, and said bias voltage is varied between said matching condition voltage and a higher magnitude voltage producing said amplitude modulated optical output signal with a negative chirp parameter.

13. The optical transmitter in accordance with claim 10 wherein said top reflector surface has a reflectivity greater than 50%, and said bias voltage is varied between said matching condition voltage and a higher magnitude voltage producing said amplitude modulated optical output signal with a negative chirp parameter.

14. The optical transmitter in accordance with claim 12 wherein said coating is a $Si/SiO_2/Si$ dielectric coating.

* * * * *